US006277289B1

(12) United States Patent
Kurian et al.

(10) Patent No.: US 6,277,289 B1
(45) Date of Patent: Aug. 21, 2001

(54) TREATMENT OF AQUEOUS ALDEHYDE WASTE STREAMS

(75) Inventors: Joseph Varapadavil Kurian; Yuan Feng Liang, both of Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/346,418

(22) Filed: Jul. 1, 1999

(51) Int. Cl.[7] .................................................. C02F 1/68
(52) U.S. Cl. ................................. 210/749; 210/908
(58) Field of Search .................................. 210/749, 908

(56) References Cited

U.S. PATENT DOCUMENTS

| 3,462,477 |   | 4/1966  | Caporali et al. ............... 260/465.3 |
|-----------|---|---------|-------------------------------------------|
| 3,893,895 |   | 7/1975  | Dehnert et al. ...................... 203/59 |
| 3,923,648 | * | 12/1975 | Lashley, Jr. ........................ 210/12 |
| 5,459,229 | * | 10/1995 | Kelsey et al. ...................... 528/275 |
| 5,606,094 | * | 2/1997  | Roof et al. ......................... 558/463 |
| 5,798,433 |   | 8/1998  | Schmidt et al. .................... 528/279 |

FOREIGN PATENT DOCUMENTS

| 1 431 511 | 4/1976  | (EP) . |                 |
|-----------|---------|--------|-----------------|
| 110 861   | 7/1986  | (EP) . |                 |
| 547 553 A1 | 6/1993  | (EP)  | ............... C08G/63/85 |
| 812 337 B1 | 12/1997 | (EP)  | ............... C08G/63/78 |
| 01 094994 | 4/1989  | (JP)   | ............................. 1/42 |

OTHER PUBLICATIONS

International Search Report dated Oct. 30, 2000.
Derwent Abstract XP002150095 of JP 01 094994 published Apr. 13, 1989.
Opposition of EP 812 337 B1 by E.I. DuPont de Nemours and Company, assignee of the subject application.
Encyclopedia of Polymer Science and Technology, John Wiley & Sons, Inc. 1964, vol. 1, p. 173.
Kirk–Othmer Encyclopedia of Chemical Technology, Third Edition, John Wiley & Sons, Inc. 1978, vol. 1, p. 290.
English Abstract of DE 3241198A, published Aug. 4, 1983, corresponding to GB 2114118A, published Aug. 17, 1983.
English Abstract of JP 55013205A, published Jan. 30, 1980.

* cited by examiner

*Primary Examiner*—David A. Simmons
*Assistant Examiner*—Betsey Morrison Hoey

(57) ABSTRACT

This invention relates to an improved process for the treatment of aqueous waste stream containing aldehydes and/or ketones, in particular, alpha, beta-ethylenically unsaturated aldehydes and ketones, which can be rendered non-toxic to biological treatment systems by contacting the waste stream with organic polyamines and/or inorganic ammonium compounds at essentially ambient conditions.

20 Claims, No Drawings

TREATMENT OF AQUEOUS ALDEHYDE WASTE STREAMS

FIELD OF THE INVENTION

This invention concerns a process for the treatment of wastewater streams containing aldehydes and/or ketones, in particular, alpha, beta-ethylenically unsaturated aldehydes comprising contacting said streams with organic diamines, organic triamines and organic tetramines, organic polyamines and/or inorganic ammonium compounds.

TECHNICAL BACKGROUND OF THE INVENTION

The toxicity of aldehydes and ketones, especially alpha, beta-ethylenically unsaturated aldehydes and ketones to biological waste treatment systems, even in low concentrations, has been recognized by those skilled in the art. A review article on this problem is presented by V. T. Stack, Jr. in Industrial and Engineering Chemistry, Volume 49 No. 5, page 913 (1957). Stack reports that of these compounds, acrolein has the most toxic effect on biological waste treatment processes. Wastewaters containing alpha, beta-ethylenically unsaturated aldehydes and ketones must be treated to reduce the concentration of these substances to very low levels before the waste water may be further treated by a biological system. Failure to adequately pretreat the wastewater streams results in the biomass being in danger of being killed or inhibited to a very low level of activity.

Treatment of waste streams containing alpha, beta-ethylenically unsaturated aldehydes and ketones are known in the art. U.S. Pat. No. 3,923,648 discloses a method for the disposal of such wastewaters comprising contacting them with sufficient base to render the pH of the wastewaters alkaline, maintaining the alkaline wastewaters at a temperature of about 25° C. to 100° C. for at least about 15 minutes and then degrading the wastewater in a biological system containing active biomass process rendering non-toxicity of alpha, beta-ethylenically unsaturated aldehydes and/or ketones to biological treatment systems by heating the wastewater with a slight excess of alkali at elevated temperatures. The preferred base is an alkali metal hydroxide, but the use of other bases is broadly disclosed including soluble organic amines such as methylamine, ethylamine, dimethylamine, triethylamine, and the like; and alkanolamines including monoalkanolamines, dialkanolamines, trialkanolamines, N-monoalkyl-monoalkanolamines, and N,N-dialkylalkanolamines and the like.

U.S. Pat. No. 5,459,229 discloses a process for the preparation of a 1,3-propanediol based polyester in which an aqueous acrolein-containing waste stream is treated with a sufficient quantity of base to increase the pH to above 7.5 for a time effective to lower the acrolein content, followed, optionally, by dilution and biotreatment. The base utilized is preferably an inorganic base, most preferably sodium hydroxide.

One objective of the present invention is to provide a more efficient and effective treatment to reduce the levels of alpha, beta-ethylenically unsaturated aldehydes and ketones in waste water streams.

SUMMARY OF THE INVENTION

The present invention provides a process for the reduction of the concentration of aldehydes and/or ketones, especially alpha, beta-unsaturated aldehydes and ketones, and most especially acrolein, in aqueous waste streams, particularily in aqueous waste streams resulting from the manufacture of 1,3-propanediol and polyesters and polyols derived therefrom in waste streams, said process comprising the steps of:

(a) contacting said aqueous waste stream with an effective amount of a nitrogen containing base selected from the group consisting of organic diamines, organic triamines and organic tetramines, organic polyamines, and inorganic ammonium compounds; and (b) maintaining said contacted waste stream at essentially ambient temperatures for a sufficient length of time to afford at least a 50% reduction in the concentration of said aldehyde or ketone.

DETAILED DESCRIPTION OF THE INVENTION

This invention relates to a process for treating aqueous "waste water" streams containing aldehydes and ketones, particularly alpha, beta-ethylenically unsaturated aldehydes and ketones which are toxic to biological waste treatment systems using selected nitrogen containing base compounds to treat said waste waters.

Preferred nitrogen containing base compounds include organic polyamines, defined herein as organic amines comprising two or more amines, preferably diamines such as hexamethylene diamine, 2-methyl pentamethylene-diamine, 2-methyl hexamethylene diamine, 3-methyl hexamethylene diamine, 2,5-dimethyl hexamethylene diamine, 2,2-dimethylpentamethylene diamine, 5-methylnonane diamine, dodecamethylene diamine, 2,2,4- and 2,4,4-trimethyl hexamethylene diamines, 2,2,7,7-tetramethyl octamethylene diamine, metaxylylidene diamine, paraxylylidene diamine, diaminodicyclohexyl methane, $C_2$–$C_{16}$ aliphatic diamines which may be substituted with one or more alkyl groups, and N-alkyl, and N'N-dialky derivatives thereof. The most preferred diamine is hexamethylene diamine. Other nitrogen containing bases containing more than 2 amine groups are also useful in the present invention. These include triamines, for example bis hexamethylene triamine, tetramines and other polyamines.

Another preferred class of nitrogen-containing base compounds is inorganic ammonium salt, e.g., ammonium carbonate.

A specific advantage that accrues to the use of hexamethylene diamine with acrolein-containing waste streams is that an insoluble solid reaction product separates from the reaction system. This allows the bulk removal of acrolein and the reaction product and the resulting carbon load from the waste stream before said waste stream is fed to the optional subsequent biological treatment. This process also eliminates the toxicity associated with the acrolein reaction products in waste streams.

The temperature utilized for the treatment is not critical. The application of this process to an industrial waste stream takes place at the existing waste stream temperature, from about 0° C. to 65° C., defined herein as "essentially ambient conditions".

Alpha, beta-unsaturated aldehydes and ketones treatable by the process of the present invention include acrolein, methacrolein (methacrylaldehyde), crotonaldehyde, 2,4-hexadienal, acetaldehyde and methyl vinyl ketone. Other aldehydes such as acetaldehyde can also be similarly treated.

The treatment process of the present invention is especially useful for the treatment of waste aqueous streams containing acrolein resulting from the manufacture of 1,3-propanediol and polyesters and polyols derived therefrom, e.g. poly(trimethylene naphthalate). Of these, a preferred application is to waste streams resulting from the manufacture of 1,3-propanediol based polyesters, most specifically to waste streams resulting from the manufacture of poly (trimethylene terephthalate) (3GT).

The preparation of 3GT polyester resins involves the reaction of excess 1,3-propanediol with terephthalic acid or a lower dialkyl ester of terephthalic acid at elevated temperature. The major toxic by-products of this reaction, acrolein and allyl alcohol, are contained in solution in the distillate. Although the amounts of these byproducts are low, it is desirable to further reduce the level of byproducts in the distillate, especially for preparing 3GT polyester from terephthalic acid and excess 1,3-propanediol.

EXAMPLES

Example 1

Treatment of Acrolein with 10% Water Solution of Hexamethylenediamine (HMD)

To a screw cap vial containing 10% of hexamethylenediamine in water solution (mixture of 0.1 g of hexamethylenediamine and 0.9 g of water), 2 mg of acrolein was injected to spike the acrolein concentration to 2000 ppm. The vial was allowed to stand at room temperature. The vial was sampled periodically and analyzed by gas chromatography with solid phase micro-extraction. The results are shown in Table I.

Example 2

Treatment of Acrolein with 1% Water Solution of Hexamethylenediamine

To a screw cap vial containing 1% of hexamethylenediamine in water solution (mixture of 0.01 g of hexamethylenediamine and 1.0 g of water), 2 mg of acrolein was injected to spike the acrolein concentration to 2000 ppm. The vial was allowed to stand at room temperature. The vial was sampled periodically and analyzed by gas chromatography with solid phase micro-extraction. The results are shown in Table I.

Example 3

Treatment of Acrolein with 0.2% Water Solution of Hexamethylenediamine

To a screw cap vial containing 0.2% of hexamethylenediamine in water solution (mixture of 0.002 g of hexamethylenediamine and 1.0 g of water), 2 mg of acrolein was injected to spike the acrolein concentration to 2000 ppm. The vial was allowed to stand at room temperature. The vial was sampled periodically and analyzed by gas chromatography with solid phase micro-extraction. The results are shown in Table I.

Example 4

Treatment of Acrolein with 0.076% Water Solution of Hexamethylenediamine

To a screw cap vial containing 0.076% of hexamethylenediamine in water solution (mixture of 0.76 mg of hexamethylenediamine and 1.0 g of water), 2 mg of acrolein was injected to spike the acrolein concentration to 2000 ppm. The vial was allowed to stand at room temperature. The vial was sampled periodically and analyzed by gas chromatography with solid phase micro-extraction. The results are shown in Table I.

As shown in Table I, the present process is effective to treat acrolein with an aqueous solution of hexamethylenediamine. Acrolein concentration is reduced to 7 ppm from initial 2000 ppm in 5 minutes, and further down to 4 ppm in 15 minutes when a 1% hexamethylenediamine solution is utilized at room temperature. The effect is still observed even with lower concentrations of HMD solution (0.2%).

TABLE I

Acrolein Concentrations (ppm) in HMD Solution vs. Time (min.) at Room Temperature

| Time (min.) | 10 wt % HMD | 1 wt % HMD | 0.2 wt % HMD | 0.076 wt % HMD |
| --- | --- | --- | --- | --- |
| 0 | 2000 | 2000 | 2000 | 2000 |
| 5 | 7 | 7 | 30 | 226 |
| 15 | 5 | 4 | 6 | 149 |
| 25 | 3.7 | 4 | | 111 |
| 35 | | 3.7 | | 90 |

Example 5

Treatment of Acrolein with 10% Water Solution of Ammonium Carbonate [$(NH_4)_2CO_3$]

To a screw cap vial containing 10% of ammonium carbonate in water solution (mixture of 0.1 g of ammonium carbonate and 0.9 g of water), 2 mg of acrolein was injected to spike the acrolein concentration to 2000 ppm. The vial was allowed to stand at room temperature. The vial was sampled periodically and analyzed by gas chromatography with solid phase micro-extraction. The results are shown in Table II.

Example 6

Treatment of Acrolein with 1% Water Solution of Ammonium Carbonate

To a screw cap vial containing 10% of ammonium carbonate in water solution (mixture of 0.01 g of ammonium carbonate and 1.0 g of water), 2 mg of acrolein was injected to spike the acrolein concentration to 2000 ppm. The vial was allowed to stand at room temperature. The vial was sampled periodically and analyzed by gas chromatography with solid phase micro-extraction. The results are shown in Table II.

Example 7

Treatment of Acrolein with 0.2% Water Solution of Ammonium Carbonate

To a screw cap vial containing 0.2% of ammonium carbonate in water solution (mixture of 0.002 g of ammonium carbonate and 1.0 g of water), 2 mg of acrolein was injected to spike the acrolein concentration to 2000 ppm. The vial was allowed to stand at room temperature. The vial was sampled periodically and analyzed by gas chromatography with solid phase micro-extraction. The results in Table II.

Example 8

Treatment of Acrolein with 0.064% Water Solution of Ammonium Carbonate

To a screw cap vial containing 0.064% of ammonium carbonate in water solution mixture of 0.64 mg of ammonium carbonate and 1.0 g of water), 2 mg of acrolein as injected to spike the acrolein concentration to 2000 ppm. The vial was allowed to stand at room temperature. The vial was sampled periodically and analyzed by gas chromatography with solid phase micro-extraction. The results are shown in Table II.

As shown in Table II, acrolein can also be treated effectively by an aqueous solution of ammonium carbonate. Acrolein concentration is reduced to 3 ppm from initial 2000 ppm in 25 minutes with 10% of ammonium carbonate solution. The effect is still very significant with lower concentrations of ammonium carbonate solution (1%).

TABLE II

Acrolein Concentrations (ppm) in Ammonium Carbonate Solution vs Time (min.) at Room Temperature

| Time (min.) | 10 wt % $NH_4CO_3$ | 1 wt % $NH_4CO_3$ | 0.2 wt % $NH_4CO_3$ | 0.064 wt $NH_4CO_3$ % |
|---|---|---|---|---|
| 0 | 2000 | 2000 | 2000 | 2000 |
| 5 | 115 | 513 | 1362 | 1857 |
| 15 |  | 50 | 359 | 1536 |
| 25 | 3 | 22 | 114 | 1077 |
| 35 | 2.7 | 12 | 47 | 855 |
| 45 |  | 9 | 26 | 680 |
| 55 |  | 4 | 16 | 538 |
| 125 |  |  |  | 180 |

What is claimed is:

1. A process for the reduction of the concentration of aldehyde(s) and/or ketone(s) in an aqueous waste stream, said process comprising the steps of
   (a) contacting the aqueous waste stream comprising the aldehyde(s) and/or ketone(s) with a water solution comprising an effective amount of an organic polyamine base; and
   (b) maintaining said contacted waste stream at essentially ambient temperatures for a sufficient length of time to afford at least a 50% reduction in the concentration of said aldehyde(s) and/or ketone(s).

2. The process of claim 1 wherein the aqueous waste stream comprises one or more aldehyde(s) and/or ketone(s) selected from the group consisting of alpha, beta-unsaturated aldehydes and ketones.

3. The process of claim 2 wherein the aldehyde(s) and/or ketone(s) is selected from the group consisting of acrolein, methacrolein (methacrylaldehyde), crotonaldehyde, 2,4-hexadienal, acetaldehyde and methyl vinyl ketone.

4. The process of claim 3 wherein the aqueous waste stream comprises acrolein.

5. The process of claim 4 comprising wherein the contacted waste stream comprises about 0.076 to about 10 weight % of the organic polyamine base.

6. The process of claim 3 comprising wherein the contacted waste stream comprises about 0.076 to about 10 weight % of the organic polyamine base.

7. The process of claim 6 wherein the organic polyamine base is hexamethylenediamine.

8. The process of claim 1 wherein the organic polyamine base is an organic diamine.

9. The process of claim 1 wherein the organic polyamine base is an organic triamine.

10. The process of claim 1 wherein the organic polyamine base is an organic tetramine.

11. The process of claim 1 wherein the organic polyamine base is an organic diamine.

12. The process of claim 1 wherein the organic polyamine base is an organic triamine.

13. The process of claim 1 wherein the organic polyamine base is an organic tetramine.

14. The process of claim 1 comprising wherein the contacted waste stream comprises at least about 0.076 weight % of the organic polyamine base.

15. The process of claim 14 comprising wherein the contacted waste stream comprises up to about 10 weight % of the organic polyamine base.

16. The process of claim 1 comprising wherein the contacted waste stream comprises at least about 0.2 weight % of the organic polyamine base.

17. The process of claim 16 comprising wherein the contacted waste stream comprises up to about 10 weight % of the organic polyamine base.

18. The process of claim 1 comprising wherein the contacted waste stream comprises at least about 1 weight % of the organic polyamine base.

19. The process of claim 18 comprising wherein the contacted waste stream comprises up to about 10 weight % of the organic polyamine base.

20. The process of claim 1 comprising wherein the contacted waste stream comprises up to about 10 weight % of the organic polyamine base.

* * * * *